May 5, 1964 | SEIJI TAKASHI | 3,131,882

MAGNETIC TAPE RECORDER

Filed Aug. 2, 1961 | 3 Sheets-Sheet 1

INVENTOR:
Seiji Takashi,

BY Singer, Stern & Carlberg
ATTORNEYS.

May 5, 1964 SEIJI TAKASHI 3,131,882

MAGNETIC TAPE RECORDER

Filed Aug. 2, 1961 3 Sheets-Sheet 2

INVENTOR:

Seiji Takashi,

BY Singer, Stern & Carlberg

ATTORNEYS

May 5, 1964 SEIJI TAKASHI 3,131,882

MAGNETIC TAPE RECORDER

Filed Aug. 2, 1961 3 Sheets-Sheet 3

INVENTOR.

Seiji Takashi,

BY Singer, Stern & Carlberg,

ATTORNEYS.

United States Patent Office 3,131,882
Patented May 5, 1964

3,131,882
MAGNETIC TAPE RECORDER
Seiji Takashi, 2752 2-chome, Kasuga-cho, Nerimaku, Tokyo, Japan
Filed Aug. 2, 1961, Ser. No. 154,381
Claims priority, application Japan May 19, 1961
3 Claims. (Cl. 242—55.12)

This invention relates to a magnetic tape recorder and more particularly to a driving means of the magnetic tape recorder.

It is conventional in the ordinary magnetic tape recorder that a rotation of a certain speed is given to reels each mounted on turntable so as to wind up a magnetic tape for effecting recording and reproduction. In such a device, it is necessary to wind up reversely the magnetic tape around one of the reels in order to prepare for the subsequent recording and reproduction. When the rotation of the reel which is adapted to wind up the magnetic tape reversely is fast, the tape can also be wound up speedily, thus making convenient the preparation of the subsequent recording and reproduction operations. It is ordinary, however, in the conventional magnetic recorder that it gives rise to loosening between the magnetic tape and the spools, and in the worst case the tape is either entangled complicatedly on several members around the reels, disengaged from the reels, or sometimes cut off during the recording or reproduction operation.

The principal object of this invention is to provide the driving means which is adapted to keep the magnetic tape always at a pulled condition under tension so as to eliminate the abovementioned disadvantages.

Another object of this invention is to provide a brake system which can be available for removing the disadvantages present in the conventional magnetic recorder.

A still another object of this invention is to provide a magnetic recorder which is easy in operation, efficient and dependable for its intended purposes.

A further another object of this invention will be apparent upon perusal of the detailed descriptions and the accompanying drawings.

The magnetic tape recorder according to the present invention comprises a frame, provided with a fixed shaft for supporting a right hand turntable and a bell crank lever pivoted beneath the frame and having a shaft on one end thereof projecting upwardly through said base frame, said shaft being adapted to support another rotary turntable for movement toward and away from the first-named turntable, said bell crank lever being provided on its other lever arm with a pin projection, an operating member slidably mounted on said base frame having a pin and slot connection with said base frame. The slidably mounted operating member is provided with a rotatable pressure roller and is urged in one direction by means of a yielding spring member. An electric motor is mounted beneath said base frame with its armature shaft extending upwardly therethrough and provided with a roller thereon which is adapted to be engaged by the movable turntable when the same is shifted in a direction such that the peripheral edge thereof will engage the periphery of said roller, the pressure roller on said slidably mounted operating member being yieldingly urged into engagement with a portion of the motor armature shaft. The slidable operating member is provided with a pin projection extending in the same direction as the pin projection on the turntable supporting bell crank lever. Mounted beneath said base frame and connected thereto by means of a pin and slot connection to facilitate sliding movement in opposite directions toward and away from said right and left hand turntables is a slidable operating plate which is provided with a series of engaging faces adapted to engage the pin projections on said slidable operating member and bell crank lever and control the movement of the pressure roller into and out of engagement with the motor armature shaft and the peripheral edge of the right hand turntable while simultaneously moving the left hand turntable away from contactual engagement with the roller on the armature shaft. Movement of the slidable plate in a right hand direction causes the pressure roller to be disengaged from its driving position and movement of the bell crank lever so that the peripheral edge of the turntable will be frictionally engaged by the motor armature shaft.

The invention also embodies a control shaft for said slidable plate having a manually operable knob secured to its outer end and a rotary switch secured to its inner end. Brake levers having offset neck portions are positioned beneath the turntables and pivotally mounted on the base frame to provide internal brake members. Thus, manual control of the operating knob to shift the slidable plate will control the rotary direction of the right and left hand turntables for recording and reproducing and rewinding of the tape.

In order that the invention may be readily carried into effect, several embodiments thereof will be described in detail, by way of examples, with reference to the accompanying drawings.

Figure 1:
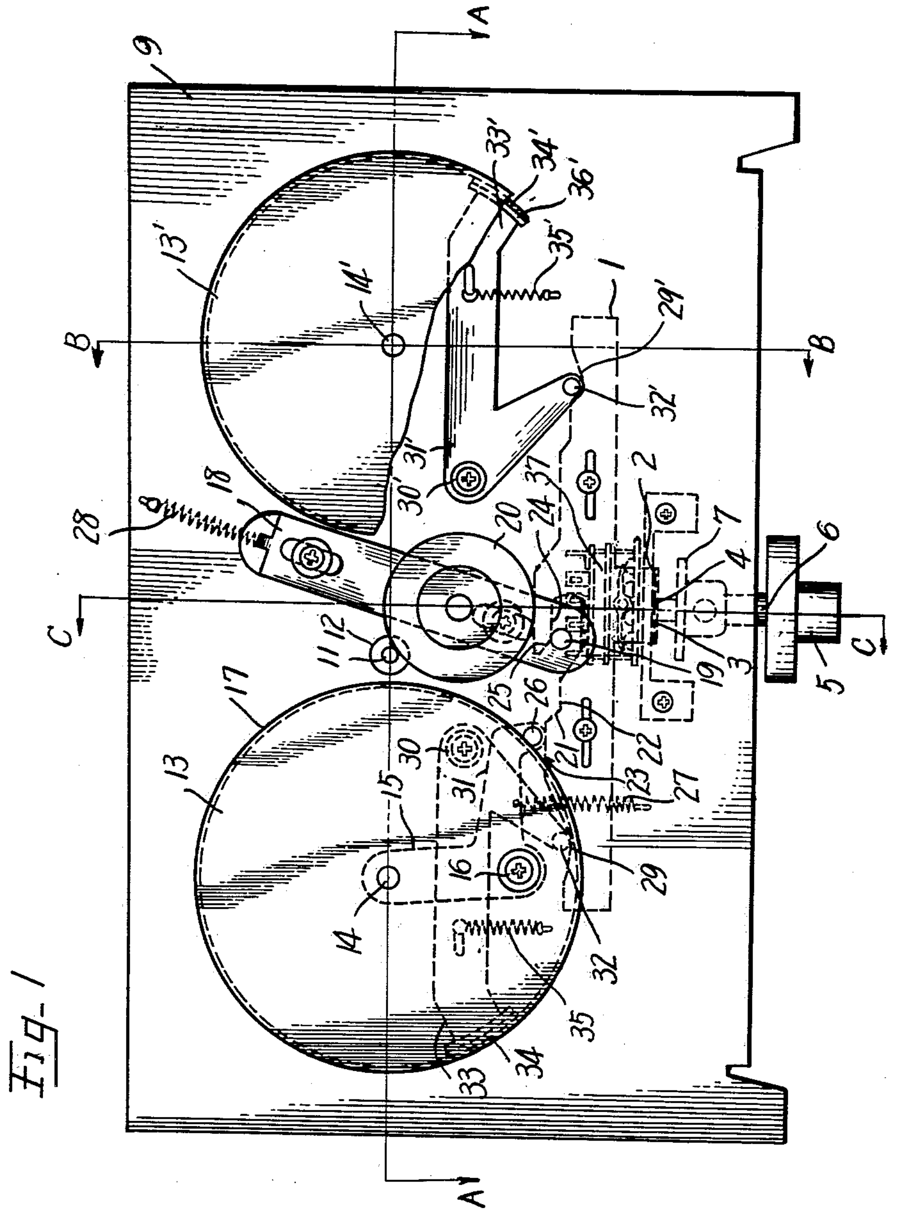
FIG. 1 is a plan view of the present magnetic recorder according to this invention.
Figure 2:
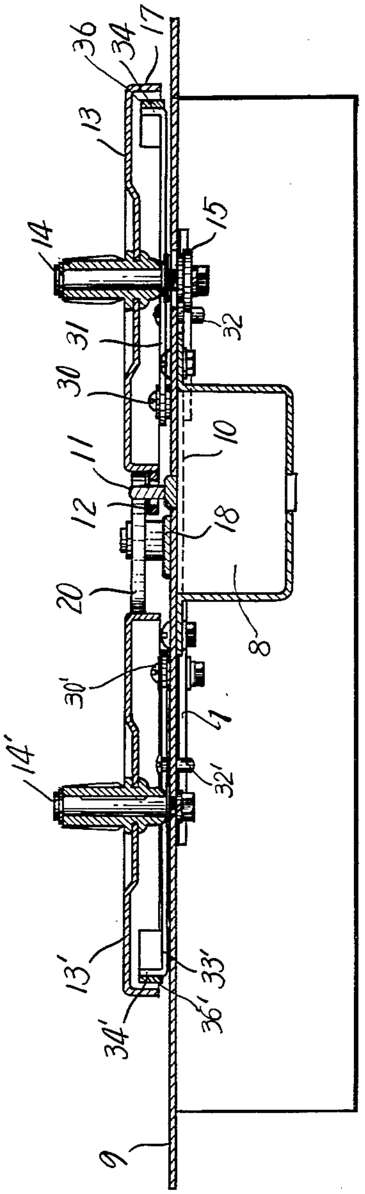
FIG. 2 is a transversal cross section taken along the line A—A of FIG. 1.
Figure 3:
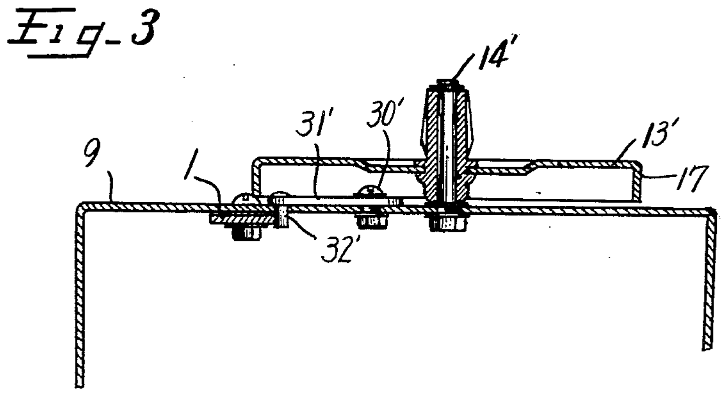
FIG. 3 is a longitudinal cross section taken along the line B—B of FIG. 1.
Figure 4:
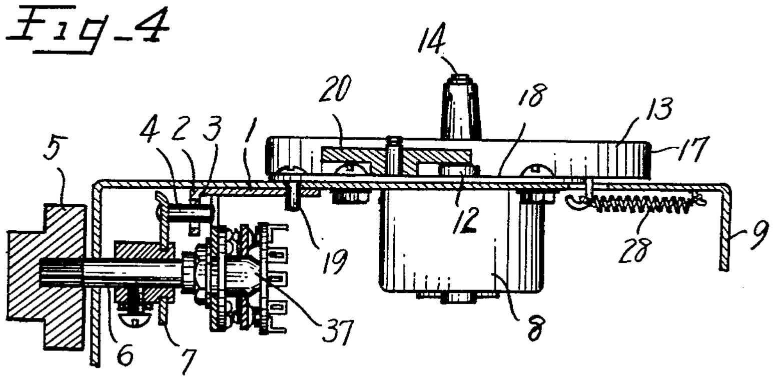
FIG. 4 is a longitudinal cross section taken along the line C—C of FIG. 1.

Referring to the accompanying drawings and particularly FIG. 1, there is shown a frame base 9 on the underside of which is pivoted a bell crank lever 15 as at 16 and said bell crank lever is provided on one arm thereof with a shaft 14 which extends upwardly through a slot in the base 9. The other lever arm is provided with a pin projection 26 (FIG. 1). Spaced from the shaft 14 is a similar shaft 14' which is anchored to the base 9 in any approved fashion. Rotatably mounted on the shafts 14 and 14' is a pair of turntables 13 and 13' to provide right and left hand magnetic tape reel supports.

Slidably arranged between said turntables and extending obliquely is an operating slide member 18 slidably connected to the base frame 9 by means of a suitable pin and slot connection. The slide member 18 is yieldingly urged in one direction by means of a tension spring 28 connected to one end thereof and to the base while the opposite end is provided with a pin projection 19 similar to the pin projection 26. Rotatably mounted on the slidable operating member 18 is a pressure roller 20 which is adapted to be selectively moved for controlling rotation of the right hand turntable 13' and is adapted to frictionally engage the peripheral edge thereof.

Mounted beneath the base frame 9 is an electric motor 8 having its armature shaft 11 extending upwardly through a suitable opening in the base frame which is adapted to drivingly engage the pressure roller 20 when the slidable operating member is moved in one direction. The electric motor 8 may be fastened to the underside of the base frame by suitable threaded fasteners in any approved manner. Secured to the projecting portion 11 of the armature shaft is a friction roller 12 which is adapted to drivingly engage the left hand turntable 13 when the same is shifted into engagement therewith by rocking movement of the bell crank lever 15. The bell crank lever 15 is yieldingly urged in a direction to hold the peripheral edge of the turntable 13 into frictional engagement with the roller 12 so that said roller will drive said turntable 13.

Also, slidably mounted beneath the base frame 9 is a control plate 1 secured in position for sliding movement by means of a suitable pin and slot connection (FIG. 1). The control plate 1 is provided with a downwardly extending portion 2 having a slot for receiving a manually operable control member projection or pin 4. The manual control for the operating plate 1 includes a shaft 6 having one end journaled in a supporting bracket attached to the underside of the base frame while its opposite end extends through a bearing opening in the front wall of the base frame and has affixed thereto a manual control knob 5. Secured to the shaft 6 by means of a suitable set screw is a collar having a lever or control disc 7 to which the operating pin 4 is affixed as by riveting or the like. The inner end of the control shaft 6 has affixed thereto a rotary electric switch 37 of the single pole, double pole type which is adapted to complete a circuit through the motor 8 and a source of electric energy (not shown) when the control shaft 6 is located to the right and left in opposite directions.

The slidable operating plate 1 has one of its edges provided with a cam surface 22 having an inclined portion 21 and a relatively straight portion 23. The cam portion 23 is adapted to engage the pin projection 26 and hold the peripheral edge of the turntable 13 out of engagement with the drive shaft 11 when said control plate 1 is moved to the right. When the control plate is moved to the left the pin projection 26 follows the inclined portion 21 to the cam portion 22 so that the spring 27 will yieldingly urge the turntable 13 into driving engagement with the shaft 11. Simultaneously shifting of the control plate 1 will reciprocate the operating slide 18 by reason of the fact that the pin projection 19 thereon will be engaged by cam surfaces 24 and 25 on the control plate 1. Consequently, when the control plate 1 is moved toward the right the pin projection 19 will travel along the surface 25 and permit the yielding action of the spring 28 to move the operating slide 18 in a direction to engage the roller 20 with the shaft 11 as well as the peripheral edge of the turntable 13′. When the control plate is moved to the left the operating member 18 with the roller 20 is shifted out of engagement with the shaft 11 as well as the peripheral edge of the turntable 13′ and the bell crank 15 being rotated in a clockwise direction so that the turntable 13 will be moved into engagement with the roller 12 and driven thereby. When the control slide plate 1 is in the position shown in FIGURE 1 the circuit through the motor is interrupted by the switch 37 and all of the parts are disengaged. The roller 12 is adapted to rotate the turntable 13 at a faster rate of speed than the turntable 13′. The slot 3 for receiving the pin 4 is shaped to permit oscillation of the pin about the shaft axis 6.

Pivotally mounted on the frame base 9 is a pair of brake levers 31, 31′ which are pivoted as at 30 and 30′ to extend in opposed relation. The brake levers 31 and 31′ are provided with angularly extending end portions 33 and 33′ and terminate in brake elements 34 and 34′. The brake elements are provided with felt brake shoes 36 and 36′ which engage the internal surface of the turntable rims as shown in FIGURE 1. The brake levers 31 and 31′ are provided with crank arms having projecting pins 32 and 32′ which are adapted to be engaged by the control slide plate 1 during its to and fro sliding movement. The control plate is provided adjacent its ends with cut away cam portions 29 and 29′ to receive the pins 32 and 32′. The brake levers 31 and 31′ are yieldingly urged in a direction to cause the brake shoes 36 and 36′ to frictionally engage the inner peripheries of the rims on the turnables 13 and 13′ by means of coil springs 35 and 35′ which have one end affixed to the respective brake levers and their opposite ends similarly affixed to the surface of the bed frame 9. It will thus be seen, that when the control slide plate 1 is shifted to the right or left the pins 32 and 32′ will be moved upwardly since they will travel out of the cut away portions 29 and 29′ and will thus move the brake levers in a direction against the action of the tension springs 35 and 35′ so that the brake shoes 36 and 36′ will be disengaged.

In the operation of the magnetic tape recorder for recording and reproducing, the switch 37 is moved to an "on" position by manipulating the knob 5 so that the motor 8 will be energized. Assuming the knob 5 to be turned in a clockwise direction, the operating plate 1 will be shifted toward the right so that the pin 19 resting on the engaging face 24 will be rolled or moved onto the engaging face 25, thus the operating slide member 18 will be moved in a direction away from the knob 5 by the yielding action of the spring 28. Simultaneously, the projections 32 and 32′ are disengaged from the contact faces 29 and 29′ and move up along the left portions of the control plate 1 so that the brake levers 31 and 31′ will be pivoted on the bolts or pivot points 30 and 30′ to disengage the brake shoes from the internal braking surface of the turntables 13 and 13′. In this position, the pin 26 of the bell crank 15 still rests on the face 23 of the control plate but slightly displaced from the neutral position shown in FIGURE 1. When the control plate 1 is thus moved to the right the pressure roller 20 simultaneously engages the shaft 11 and the external periphery of the turntable 13′. The peripheries of the turntables are formed into flanged portions 17 and 17′. With the control plate 1 displaced to the right the turntable 13′ will be driven at a predetermined low speed for recording and reproducing.

By shifting the control plate 1 to the left to a neutral position the roller 20 will be disengaged and the brake shoes 36 and 36′ will frictionally engage the internal surfaces of the rims 17 and 17′ and cause the turntables to be arrested. In order to reverse the direction of movement of the tape so as to rewind the same, the control knob 5 is turned in a direction to shift the control plate 1 toward the left hand turntable 13. As this occurs the brake shoes are released and the pin 26 of the bell crank 15 is permitted to drop into a recess in the control plate along the surface 22 (FIG. 1). When this occurs, the coil spring 27 yieldingly urges the turntable 13 toward the right so that the roller 12 on the motor shaft 11 will frictionally and drivingly engage the rim 17. Simultaneously, the pin projection 19 maintains the roller 20 out of driving engagement by being engaged by the surface 24 on the control plate 1. When the assembly is in this position the turntable or reel 13 will be rotated rapidly to rewind the tape and after the same has been rewound the control knob 5 is turned in a direction to shift the control plate 1 to its neutral position and thereby set the brakes and simultaneously shift the turntable 13 to the left and out of engagement with the roller 12. Due to the fact that the brake levers are provided with angular portions 33 and 33′ it will be seen that the brake lever for one turntable will be arranged differently from the brake of the other turntable according to the direction of tape movement so that during the stopping operation and when the brakes are applied one or the other thereof will produce a self-gripping action and place the tape under tension until the parts have come to rest.

When it is desired to stop rotation of the turntables 13 and 13′ from rotating in a counterclockwise direction as for recording and reproducing, the brake element 34 on the neck portion 33 will be strongly urged and forced into engagement with the internal peripheral surface of the rim 17 and thus produce a self-braking action while the brake element 34′ will be presented in a different direction and the braking action will not be as great as that achieved by the braking element 34, thus the turntable 13 will be braked appreciably quicker than the turntable 13′ and the tape will thus be stopped under tension. When it is intended to stop the turntables 13 and 13′ when rotating in a clockwise direction for rapid rewinding, the braking face 34′ is strongly urged with a force greater than that of the braking face 34 against the inner periphery of the rim 17', on the contrary, so that the turnable 13' will be stopped appreciably quicker than the turntable 13, thus stopping the tape under tension as well.

Changes may be made in the form of parts, and in the details of construction and arrangement shown herein, without departing from the spirit of the invention, and such changes are intended to be within the scope of the invention as defined by the claims.

What I claim is:

1. In a magnetic tape recorder, a base frame, a take-up reel turntable rotatably mounted on said base frame, a bell crank lever pivoted on said base frame, a bearing pin on one of the arms of said bell crank lever, a supply reel turntable rotatably mounted on said bearing pin, a pin projection on the opposite end of the other arm of said bell crank lever, an electric motor mounted beneath said base frame with its armature shaft projecting upwardly through an opening therein in spaced relation from said supply reel turntable, yielding spring means connected to said bell crank lever to urge said supply reel turntable in a direction toward said armature shaft, a roller on said armature shaft adapted to be frictionally engaged by the peripheral surface of said supply reel turntable, a slide member slidably mounted on said base frame and arranged between said turntables to slide in an oblique direction with respect to said base frame, a friction roller rotatably mounted on said slide member, yielding spring means connected to one end of said slide member to urge said friction roller into engagement with said armature shaft and the peripheral surface of said take-up reel turntable, an operating plate slidably mounted beneath said base frame having cut away portions along one edge thereof forming cam surfaces for engaging said pin projection on said bell crank lever to disengage said supply reel turntable from said armature shaft and for sliding said slide member in a direction to disengage said friction roller from said armature shaft and take-up reel turntable whereby the take-up reel turntable and supply reel turntable can be alternately driven in opposite directions, manually operable means for moving said operating plate from a neutral position in opposite directions therefrom so that in one position of the operating plate in one of said directions of movement the friction roller will drivingly connect the armature shaft to the take-up reel turntable and when moved in the opposite direction said operating plate will shift the friction roller out of said driving engagement and actuate said crank lever to move the supply reel turntable into engagement with the roller on said armature shaft, bell-shaped levers pivotally mounted beneath said turntables having brake lever arms arranged in opposed relation and crank lever arms extending in the direction of said operating plate, yielding spring means for urging said brake lever arms into a braking position, cam engaging pins on said brake lever crank arms engageable with other cam surfaces on said operating plate, brake shoes on said brake lever arms normally urged into engagement with said turntables when said operating plate is in a neutral position whereby movement of said operating plate in either direction from said neutral position will disengage said brake shoes and selectively drive the take-up and supply turntables in opposite directions.

2. In a magnetic tape recorder as set forth in claim 1 in which said brake lever arms are provided with obliquely extending end portions which extend in a direction away from the slide member whereby the contact friction of the brake lever arm with the turntable supplying the tape will be greater than that applied to the turntable taking up the tape.

3. In a magnetic tape recorder according to claim 1 wherein said roller on said armature shaft has a diameter greater than the diameter of the armature shaft whereby the take-up reel turntable when driven by said friction roller on the slide member is rotated at a slower speed during recording and reproducing than the supply reel turntable during the rewinding operation so that said magnetic tape can be quickly and rapidly rewound after recording.

References Cited in the file of this patent

UNITED STATES PATENTS

| | | |
|---|---|---|
| 2,712,448 | Schroter | July 5, 1955 |
| 2,741,439 | Dale et al. | Apr. 10, 1956 |
| 2,785,892 | Pastor | Mar. 19, 1957 |
| 2,869,684 | Tarbuck | Jan. 20, 1959 |
| 2,905,406 | Falck-Pedersen | Sept. 22, 1959 |
| 2,937,817 | Loewe et al. | May 24, 1960 |
| 2,983,794 | Shields | May 9, 1961 |
| 3,057,570 | Smith | Oct. 9, 1962 |
| 3,073,540 | Guest | Jan. 15, 1963 |